(12) United States Patent
Reddi et al.

(10) Patent No.: US 11,449,676 B2
(45) Date of Patent: Sep. 20, 2022

(54) SYSTEMS AND METHODS FOR AUTOMATED DOCUMENT GRAPHING

(71) Applicant: JPMORGAN CHASE BANK, N.A., New York, NY (US)

(72) Inventors: Murugan Reddi, New York, NY (US); Brendan Offer, Oradell, NJ (US); Haley Kotch, Suffern, NY (US); Michael Lasso, Stamford, CT (US); Badr Missaoui, New York, NY (US); Gavin Ramsey, Teddington (GB)

(73) Assignee: JPMORGAN CHASE BANK, N.A., New York, NY (US)

( * ) Notice: Subject to any disclaimer, the term of this patent is extended or adjusted under 35 U.S.C. 154(b) by 187 days.

(21) Appl. No.: 16/569,258

(22) Filed: Sep. 12, 2019

(65) Prior Publication Data

US 2020/0089758 A1    Mar. 19, 2020

Related U.S. Application Data

(60) Provisional application No. 62/731,231, filed on Sep. 14, 2018.

(51) Int. Cl.
*G06F 40/295* (2020.01)
*G06F 16/93* (2019.01)
(Continued)

(52) U.S. Cl.
CPC .......... *G06F 40/295* (2020.01); *G06F 16/215* (2019.01); *G06F 16/93* (2019.01); *G06F 40/242* (2020.01); *G06F 40/253* (2020.01)

(58) Field of Classification Search
None
See application file for complete search history.

(56) References Cited

U.S. PATENT DOCUMENTS

| 6,424,982 B1 | 7/2002 | Vogel |
| 8,954,440 B1 * | 2/2015 | Gattani .................. G06F 16/93 |
| | | 707/738 |

(Continued)

OTHER PUBLICATIONS

Zhao, Xuejiao, Zhenchang Xing, Muhammad Ashad Kabir, Naoya Sawada, Jing Li, and Shang-Wei Lin. "Hdskg: Harvesting domain specific knowledge graph from content of webpages." In 2017 ieee 24th international conference on software analysis, evolution and reengineering (saner), pp. 56-67. IEEE, 2017. (Year: 2017).*

(Continued)

*Primary Examiner* — Frank D Mills
(74) *Attorney, Agent, or Firm* — Greenberg Traurig LLP (57) ABSTRACT

Systems and methods for automated document graphing are disclosed. In one embodiment, in an information processing apparatus comprising at least one computer processor, a method for automated document graphing may include: (1) receiving, from a document repository, a plurality of source documents; (2) extracting text from each of the plurality of source documents; (3) cleaning the extracted text by removing unnecessary characters from the extracted text; (4) rewriting multi-word proper nouns in the extracted text; (5) converting a plurality of words in the extracted text to lemma form; (6) rewriting compound terms in the extracted text; (7) removing stop words from the extracted text; (8) representing each of the remaining words in the extracted text as a vector; and (9) storing the vectors in a library.

16 Claims, 8 Drawing Sheets

(51) Int. Cl.
G06F 16/215 (2019.01)
G06F 40/242 (2020.01)
G06F 40/253 (2020.01)

(56) References Cited

U.S. PATENT DOCUMENTS

| | | | |
|---|---|---|---|
| 9,552,412 B1* | 1/2017 | Lowe | G06F 16/93 |
| 9,710,544 B1* | 7/2017 | Smith | G06F 40/30 |
| 10,095,747 B1* | 10/2018 | Rajpara | G06F 16/24575 |
| 11,030,999 B1* | 6/2021 | Yu | G10L 15/30 |
| 2006/0116867 A1* | 6/2006 | Moore | G06F 40/45 |
| | | | 704/2 |
| 2008/0205774 A1* | 8/2008 | Brinker | G06F 16/353 |
| | | | 382/225 |
| 2011/0087669 A1 | 4/2011 | Ancin et al. | |
| 2012/0296891 A1 | 11/2012 | Rangan | |
| 2016/0247061 A1 | 8/2016 | Trask et al. | |
| 2016/0299955 A1* | 10/2016 | Jain | G06F 16/313 |
| 2019/0005049 A1* | 1/2019 | Mittal | G06F 16/316 |
| 2019/0347668 A1* | 11/2019 | Williams | H04L 67/2833 |
| 2019/0370397 A1* | 12/2019 | Kummamuru | G06F 40/295 |

OTHER PUBLICATIONS

International Search Report, dated Jan. 21, 2020, from corresponding International Application No. PCT/US2019/050901.
Written Opinion of the International Searching Authority, dated Jan. 21, 2020, from corresponding International Application No. PCT/US2019/050901.

* cited by examiner

SYSTEMS AND METHODS FOR AUTOMATED DOCUMENT GRAPHING

RELATED APPLICATIONS

This application claims the benefit of U.S. Provisional Patent Application Ser. No. 62/731,231, filed Sep. 14, 2018, the disclosure of which is hereby incorporated by reference in its entirety

BACKGROUND OF THE INVENTION

1. Field of the Invention

The present disclosure generally relates to systems and methods for automated document graphing.

2. Description of Related Art

In the course of their work, lawyers and other professionals are often required to evaluate whether two documents are about similar things. This could be during, for example, litigation e-discovery, impact assessment of legal developments, mapping legal obligations to the control framework of an organization, etc. Often, the sheer number of documents makes it impractical, if not impossible, to read them all manually.

SUMMARY OF THE INVENTION

Systems and methods for automated document graphing are disclosed. In one embodiment, in an information processing apparatus comprising at least one computer processor, a method for automated document graphing may include: (1) receiving, from a document repository, a plurality of source documents; (2) extracting text from each of the plurality of source documents; (3) cleaning the extracted text by removing unnecessary characters from the extracted text; (4) rewriting multi-word proper nouns in the extracted text; (5) converting a plurality of words in the extracted text to lemma form; (6) rewriting compound terms in the extracted text; (7) removing stop words from the extracted text; (8) representing each of the remaining words in the extracted text as a vector; and (9) storing the vectors in a library.

In one embodiment, the source documents may include binary files.

In one embodiment, the unnecessary characters may include at least one of a mark, a symbol, a control character, an email address, and a URL.

In one embodiment, the step of rewriting multi-word proper nouns may include identifying the multi-word proper noun; and rewriting the multi-word proper noun as a single term by inserting an underscore between the words in the multi-word proper noun. The multi-word proper noun may be identified as a multi-word proper noun using a knowledge graph.

In one embodiment, the lemma form may include a dictionary or canonical form.

In one embodiment, the step of rewriting compound terms may include identifying the compound terms; and rewriting the compound terms as single term by inserting an underscore between the terms in the compound terms.

In one embodiment, the compound terms may be identified as a compound terms using a knowledge graph.

In one embodiment, the step of removing stop words from the extracted text may include identifying a word in the extracted text as a stop word using a list of stop words.

In one embodiment, the step of representing each of the remaining words in the extracted text as a vector may include applying a skip grain algorithm to the remaining words.

According to another embodiment, in an information processing apparatus comprising at least one computer processor, a method for document vectorization may include: (1) receiving, from a document repository, a plurality of source documents; (2) extracting text from each of the plurality of source documents; (3) cleaning the extracted text by removing unnecessary characters from the extracted text; (4) separating the text into a plurality of parts; (5) identifying proper noun vectors in the plurality of parts and mapping the proper nouns to vectors in a vector library; (6) converting a plurality of words in the extracted text to lemma form; (7) rewriting compound term vectors in the extracted text and mapping the compound term vectors to vectors in the vector library; (8) mapping each of the remaining words to a vector in the vector library; and (9) generating a document vector for the vectors in the document.

In one embodiment, the method may further include retrieving a plurality of document vectors for a plurality of documents in a document library; calculating a cosine similarity for the document vector; calculating a cosine similarity for each of the plurality of documents in the document library; comparing the cosine similarity for the document vector to the cosine similarities for each of the plurality of documents in the document library; and storing the cosine similarity comparisons in a document graph.

In one embodiment, the method may further include calculating a locality sensitive hash for the document vector.

According to another embodiment, in an information processing apparatus comprising at least one computer processor, a method of document querying using a document graph may include: (1) retrieving a query comprising a source document, wherein the source document is associated with a source document vector; (2) identifying a locality sensitive hashing bucket for the source document; (3) calculating a cosine similarity score for the source document vector and a plurality of document vectors for each document associated with the locality sensitive hashing bucket; (4) selecting the documents vector having the closest cosine similarity with the source document vector; and (5) identifying the document associated with the document vector.

In one embodiment, the method may further include identifying a plurality of words common to the source document and the identified document; and presenting the identified document and the plurality of words common to the source document and the identified document.

In one embodiment, similar vectors are likely to be hashed to the same locality sensitive hashing bucket.

In one embodiment, dissimilar vector pairs are not checked for similarity.

In one embodiment, the method may further include querying a graph database for documents having a similar cosine similarity. In one embodiment, the graph database may include a knowledge graph.

BRIEF DESCRIPTION OF THE DRAWINGS

In order to facilitate a fuller understanding of the present invention, reference is now made to the attached drawings.

The drawings should not be construed as limiting the present invention but are intended only to illustrate different aspects and embodiments.

DETAILED DESCRIPTION OF PREFERRED EMBODIMENTS

Systems and methods for automated document graphing are disclosed. In embodiments, the document graph may augment a human reviewer and accelerate the process of evaluating documents for their similarity. It may also be used to make a document and/or text the basis of a query.

Embodiments disclosed herein estimate the similarity between units of text (e.g., documents, paragraphs or individual words). The documents and/or text may be converted into a vector that may capture an average "meaning" of a document as a distributed numerical representation. These vectors can then be compared mathematically and a similarity percentage may be calculated.

In embodiments, the similarity may be visualized as an interactive graph that may be traversed by a user such that a universe of documents may be explored, "jumping" from document to document. Each arc in the graph may be labelled with a key word that identifies the nature of the relationship between the source and target document, such as keywords common to the documents. The vectorization of text may use a word embedding library produced using machine learning.

Embodiments may use a knowledge graph that may supplement, or may provide an alternative, to search and discovery, using one or more document as the basis of information retrieval. The knowledge graph may include a graph of collected knowledge (e.g., top-down) to augment machine learning findings (e.g., bottom-up).

Embodiments may provide an interactive exploratory application that identifies and visualizes relationships between documents, labelling the relationships with keywords to help understand the nature of the connection.

Figure 1:
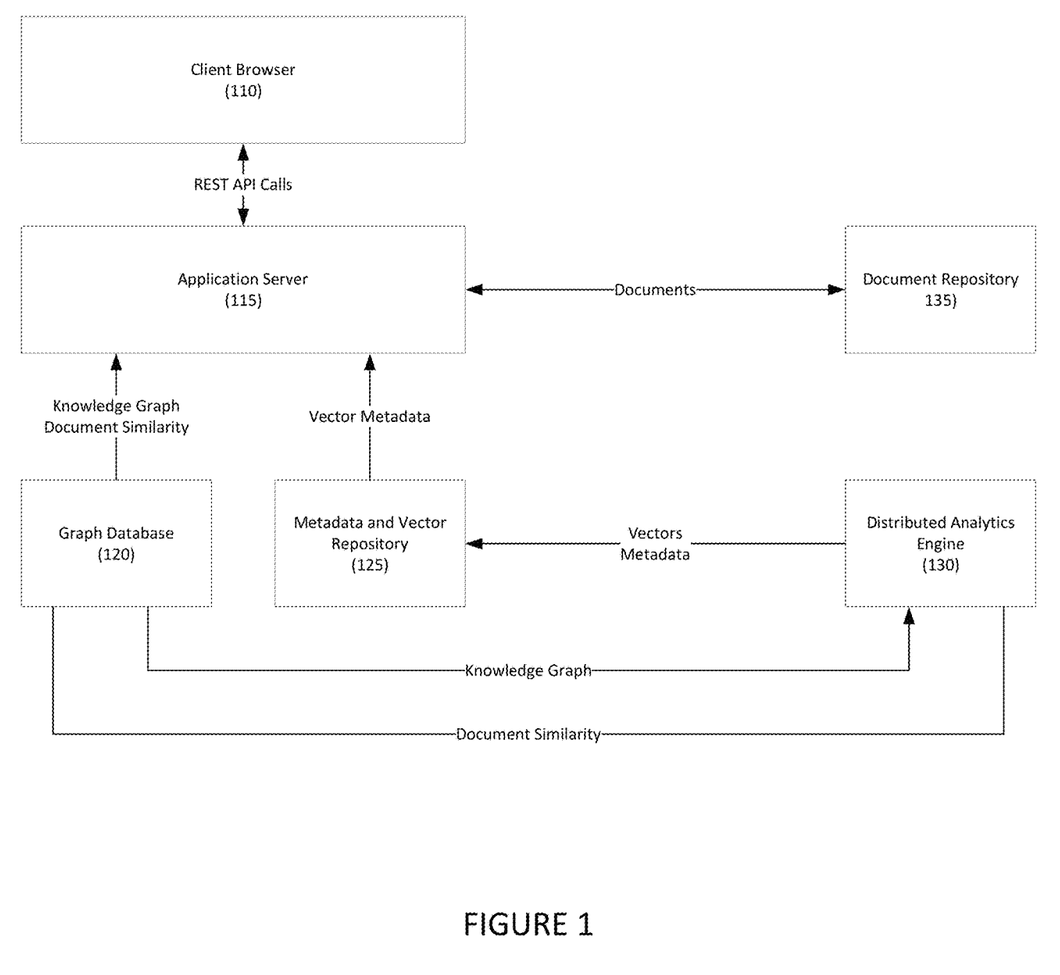
FIG. 1 depicts a system for automated document graphing according to one embodiment.

Referring to FIG. 1, a system for automated document graphing is disclosed according to one embodiment. System 100 may include client browser 110 that may provide user access to view the document graph.

Application server 115 may be a software framework that may create web applications and may provide a server environment to run those applications. Application server 115 may run the service code that responds to client REST commands, and may generate the appropriate graph of documents for rendering.

Graph database 120 may include a database that uses graph structures for semantic queries with nodes, edges and properties to represent and store data. Graph database 120 may be used to master and maintain the knowledge graph, and may act as a repository for the derived network of relationships between documents.

Metadata and vector repository 125 may be a database storing metadata harvested and/or derived from the source documents and may also store vector representations of the source documents and their constituent words/compound terms.

Document repository 135 may be a database storing the source documents in their native binary form.

Distributed analytics engine 130 may include a network of servers running a distributed analytics engine for large-scale data processing.

In one embodiment, application server 115 may interact with document repository 135 that may maintain a plurality of documents. Application server 115 may receive, for example, a knowledge graph and document similarity (e.g., a score representing a probability that the documents are similar in meaning) from graph database 120, and vectors and metadata from metadata and vector repository 125. Distributed analytics engine 130 may receive and analyze source documents, and may generate and provide vectors and metadata to metadata and vector repository 125. Distributed analytics engine 130 may further receive the knowledge graph from graph database 120, and may return document similarity.

Figure 2:
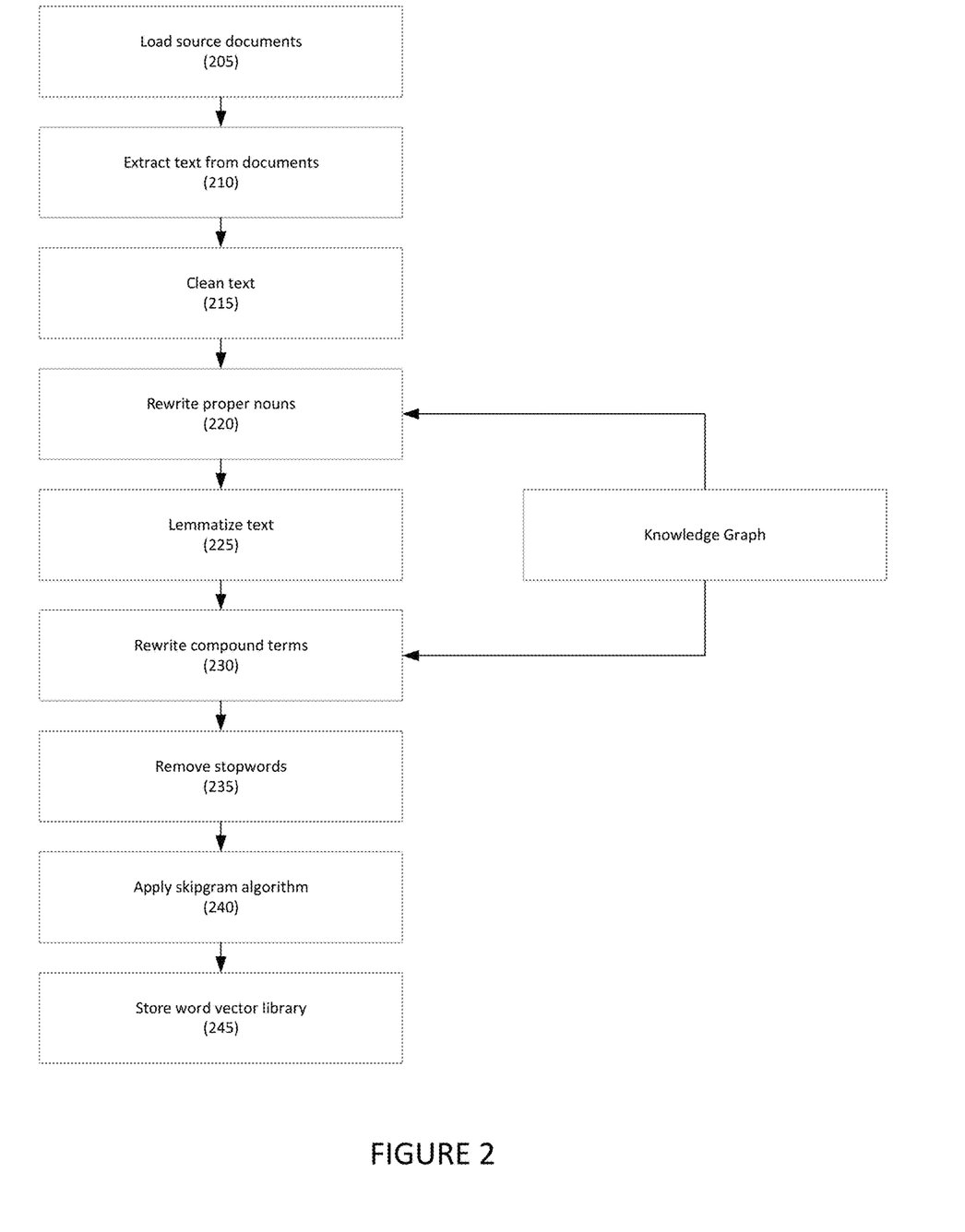
FIG. 2 depicts a method for automated document graphing according to one embodiment.

Referring to FIG. 2, a method of vector library generation is disclosed according to one embodiment.

In step 205, source documents may be loaded from a document repository. For example, a set of source documents may be loaded into a location accessible by an analytics engine.

In one embodiment, the source documents may be training documents.

In step 210, text may be extracted from the source documents. For example, the source documents may be converted from binary files such as pdf, Microsoft Word, Microsoft Excel, etc. into buckets of text.

In step 215, the text may be cleaned. For example, unnecessary characters, such as marks, symbols, control characters, email addresses, URLs, etc. may be removed. Other cleaning may be performed as is necessary and/or desired.

In step 220, proper nouns may be rewritten. For example, using a knowledge graph or a similar database or library, occurrences of multi-word proper nouns may be identified and rewritten using, for example, an underscore instead of a space. For example, New York is rewritten as New_York.

Examples of knowledge graphs are disclosed in U.S. Provisional Patent Application Ser. No. 62/731,170, filed Sep. 14, 2018, and U.S. patent application Ser. No. 16/569,014, filed Sep. 12, 2019, the disclosures of which are hereby incorporated by reference in their entireties.

For example, a knowledge graph or similar may be flattened and may be used to provide a set of compound terms and proper nouns. The knowledge graph may provide a linkage between concepts and appropriate synonyms and hyponyms.

In step 225, the text may be Lemmatized. For example, words in the text may be converted into their lemma forms (i.e., dictionary or canonical form). For example, walking is converted to walk, better is converted to good, etc.

In step 230, compound terms may be rewritten. For example, using the knowledge graph or a similar database or library, occurrences of domain specific multi-word compounds are identified and rewritten using, for example, an underscore instead of a space. For example, a collateralized bond obligation becomes collateralized_bond_obligation.

In step 235, stop words may be removed. For example, the most common words in the language such as the, is, at, etc., may be removed. The precise list of words to use may be supplied through a custom stop list.

In step 240, the skip grain algorithm may be applied. For example, the remaining text may be run through a distributed analytics engine and the skip gram neural network algorithm may be applied. This may generate a word embedding library where each word (or compound word expression) is represented by a vector.

In step 245, the word vector library may be stored. For example, the produced word vector library may be stored in a persistent repository that can be queried.

Figure 3A:
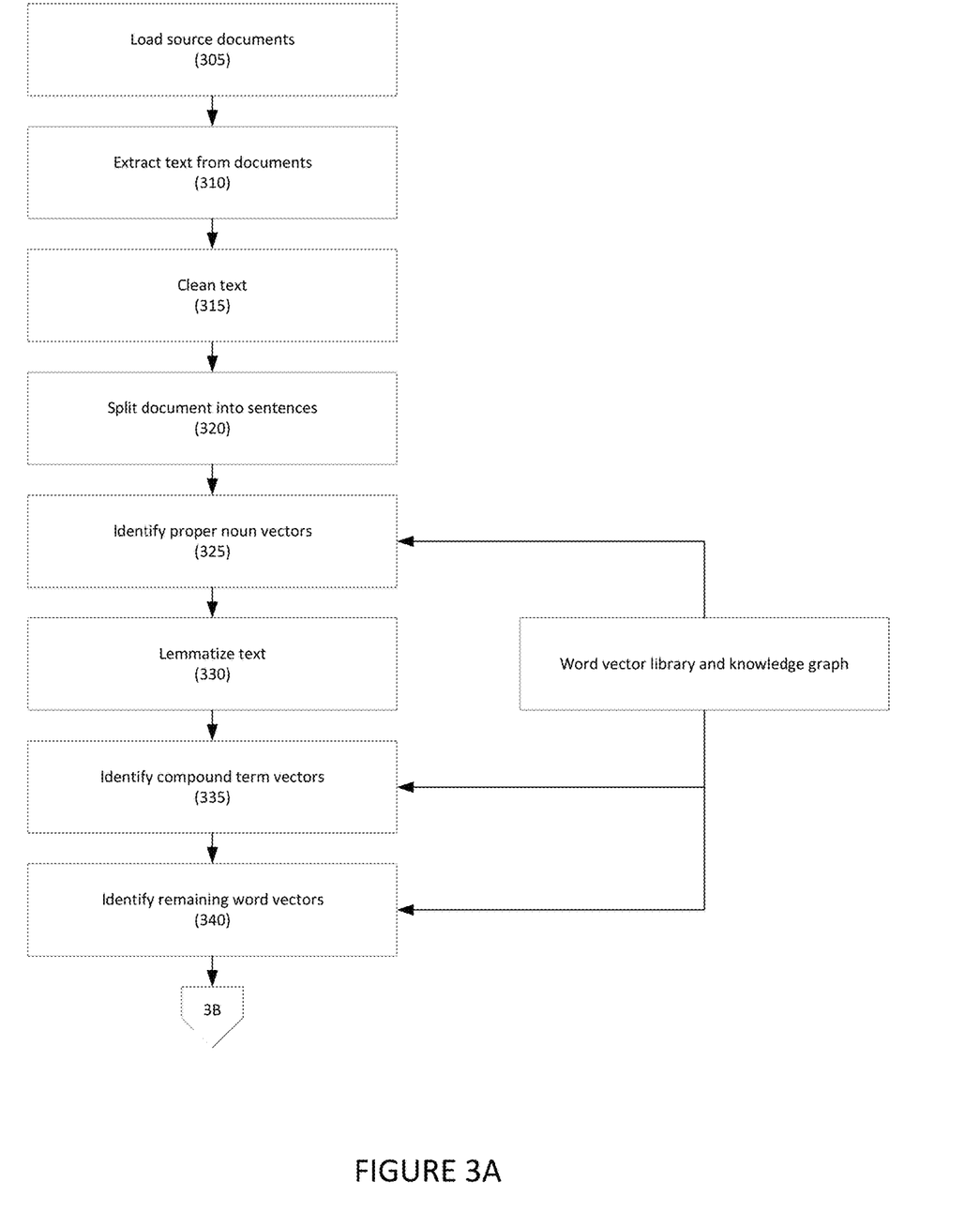
FIGS. 3A and 3B depict a method of document vectorization according to one embodiment.
Figure 3B:
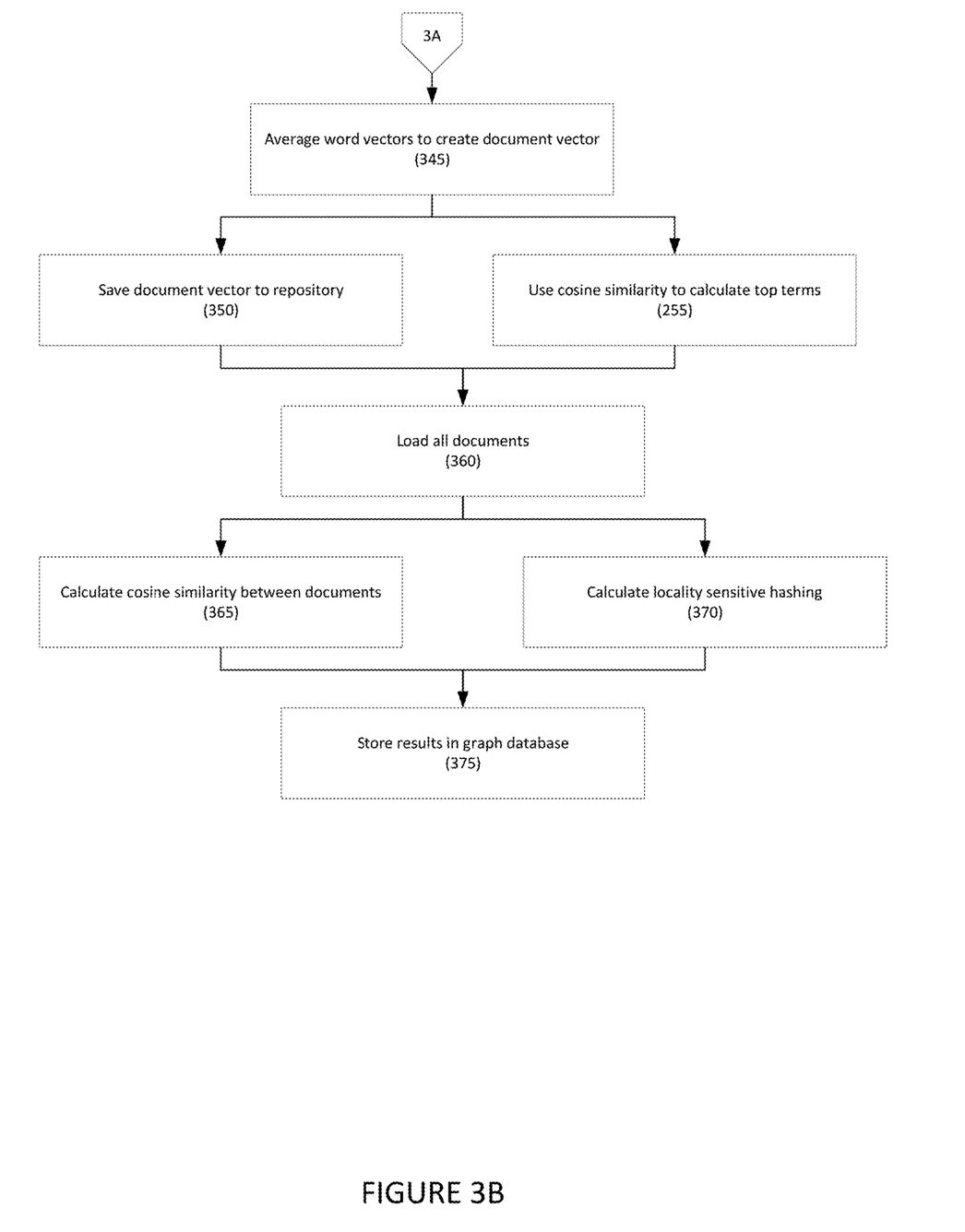

Referring to FIGS. 3A and 3B, a method of document vectorization is disclosed according to one embodiment.

In step 305, the document to be converted into a vector may be loaded.

In step 310, text from the document may be extracted. For example, the document may be converted from a binary file such as pdf, Microsoft Word, Microsoft Excel, etc. into a bucket of text.

In step 315, the text may be cleaned. For example, unnecessary characters, such as marks, symbols, control characters, email addresses, URLs, etc. may be removed.

In step 320, the document may be split into parts, such as sentences.

In step 325, proper noun vectors may be identified. For example, using the knowledge graph and the word vector library and/or a similar database or library, occurrences of multi-word proper nouns may be identified and mapped to appropriate vectors in the library.

In one embodiment, after having encoded compound terms and proper nouns as vectors, the operation may be repeated every time a new document is compared to maintain equivalence during the comparison. For example, if one document has "Proper Noun" and another has "Proper Noun" they will not appear to match even though they are the same.

In step 330, the text may be Lemmatized. For example, words in the text may be converted into their lemma forms (i.e., dictionary or canonical form). For example, walking is converted to walk, better is converted to good, etc.

In step 335, compound term vectors may be identified and mapped. For example, using the knowledge graph and the word vector library and/or a similar database or library, the occurrences of domain specific multi-word compounds may be identified and mapped to the appropriate vectors in the library.

In step 340, remaining word vectors may be mapped. For example, using the knowledge graph and the word vector library and/or a similar database or library, the remaining words (where applicable) may be mapped to the appropriate vectors.

In one embodiment, after the vectors for all words in the lexicon have been generated, the vectors may be stored and may be retrievable from a repository.

In step 345, the words in the document may be averaged to create a document vector for the document. For example, the mapped vectors from the word vector library may be averaged into a single document vector.

In step 350, the document vector may be saved to a repository, such as a persistent repository that can be queried.

In parallel, in step 355, cosine similarity may be used to calculate top terms in the document. For example, the top keywords for the document may be identified by comparing word vectors from the library with the produced document vector.

After all documents from a batch of documents have been vectorized, in step 360, the document vectors may be loaded. For example, all the document may be loaded into a location accessible by the calculation engine.

In step 365, the cosine similarity between each individual document vector may be calculated.

In step 370, locality sensitive hashing may be calculated. For example, the locality sensitive hash bucket for each document vector may be calculated.

In step 375, the results of both locality sensitive hashing and cosine similarity may be stored in a in graph database for later retrieval.

Figure 4:
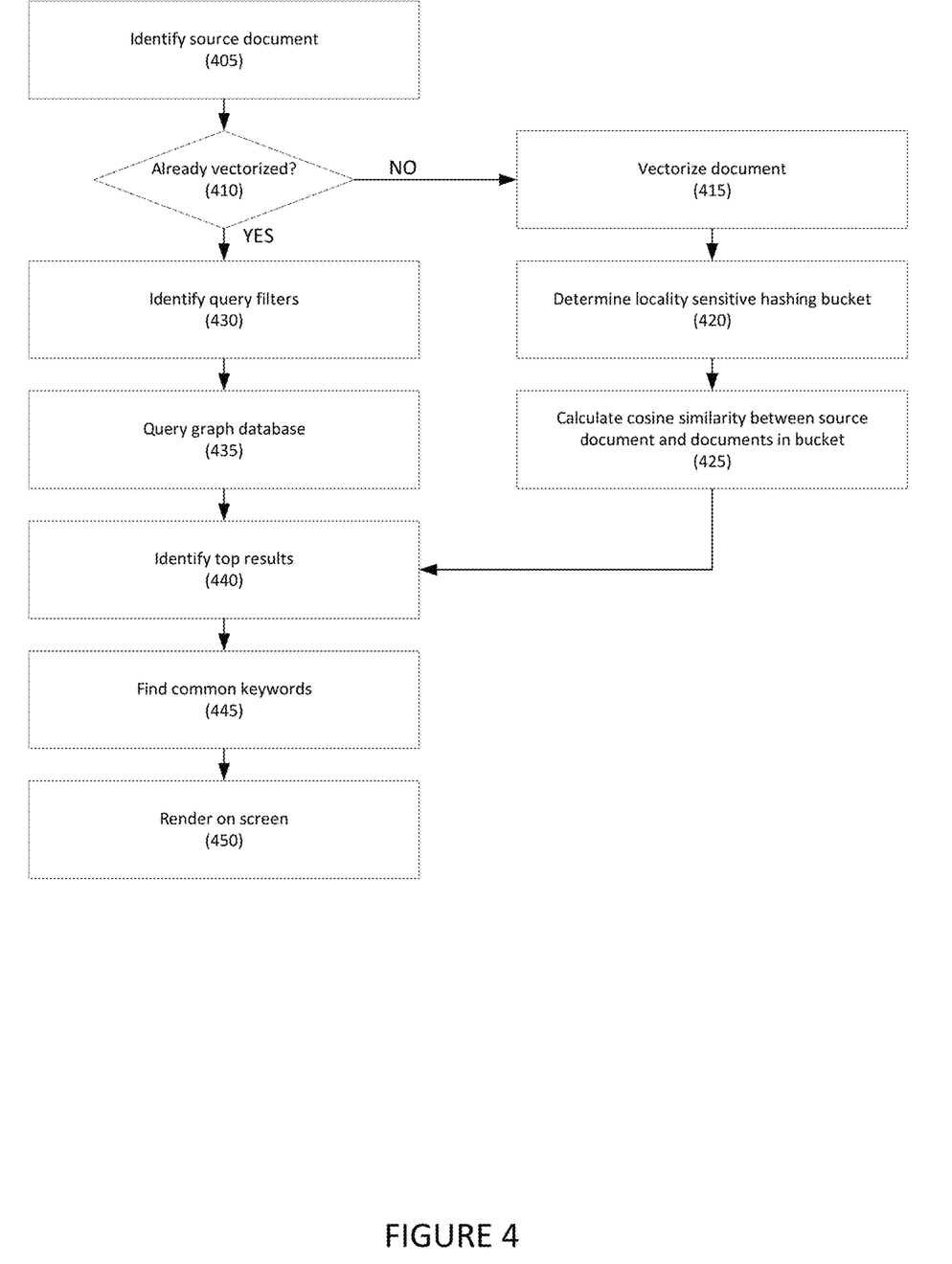
FIG. 4 depicts a method of document querying according to one embodiment.

Referring to FIG. 4, a method of document querying is disclosed according to one embodiment.

In step 405, a source document that is being used as the basis of the query is identified.

In step 410, a check is made to see if the document is new (e.g., it has not already been vectorized). If the document has not been vectorized, in step 415, the document is converted into a vector using the document vectorization process.

In step 420, the appropriate locality sensitive hashing bucket that best corresponds to the document vector may be determined. For example, vectors may be hashed several times and in such a way that similar vectors are more likely to be hashed to the same bucket than dissimilar vectors are. Pairs that hashed to the same bucket for any of the hashings may be a candidate pair. The candidate pairs may then be checked for similarity.

Dissimilar pairs should not hash to the same bucket, and should therefore not be checked for similarity.

In step 425, cosine similarity scores between the source document and all the other documents within the same locality sensitive hashing bucket are calculated.

Cosine similarity may be used to measure how similar the documents are irrespective of their size. Mathematically, it measures the cosine of the angle between two vectors projected in a multi-dimensional space. The cosine similarity is advantageous because even if the two similar documents are far apart by the Euclidean distance (due to the size of the document), they may still be oriented closely together. Thus, smaller the angle, the higher the cosine similarity.

When the document is not new and already exists in vector form within the document repository, in step 430, any filters specified by the user that would restrict the result set may be identified.

In step 435, the graph database may be queried to determine the documents that closest cosine similarity while adhering to the filter restrictions.

In step 440, a set of documents that have the closest cosine similarity to the source document may be identified.

In step 445, for each pair of documents (source document to one result document), the set of most relevant keywords that are common to both source and result may be identified.

In step 450, the results of source document, result documents and intermediate keywords may be rendered on the screen for the user. Illustrative examples are shown in FIGS. 5-7.

Figure 5:
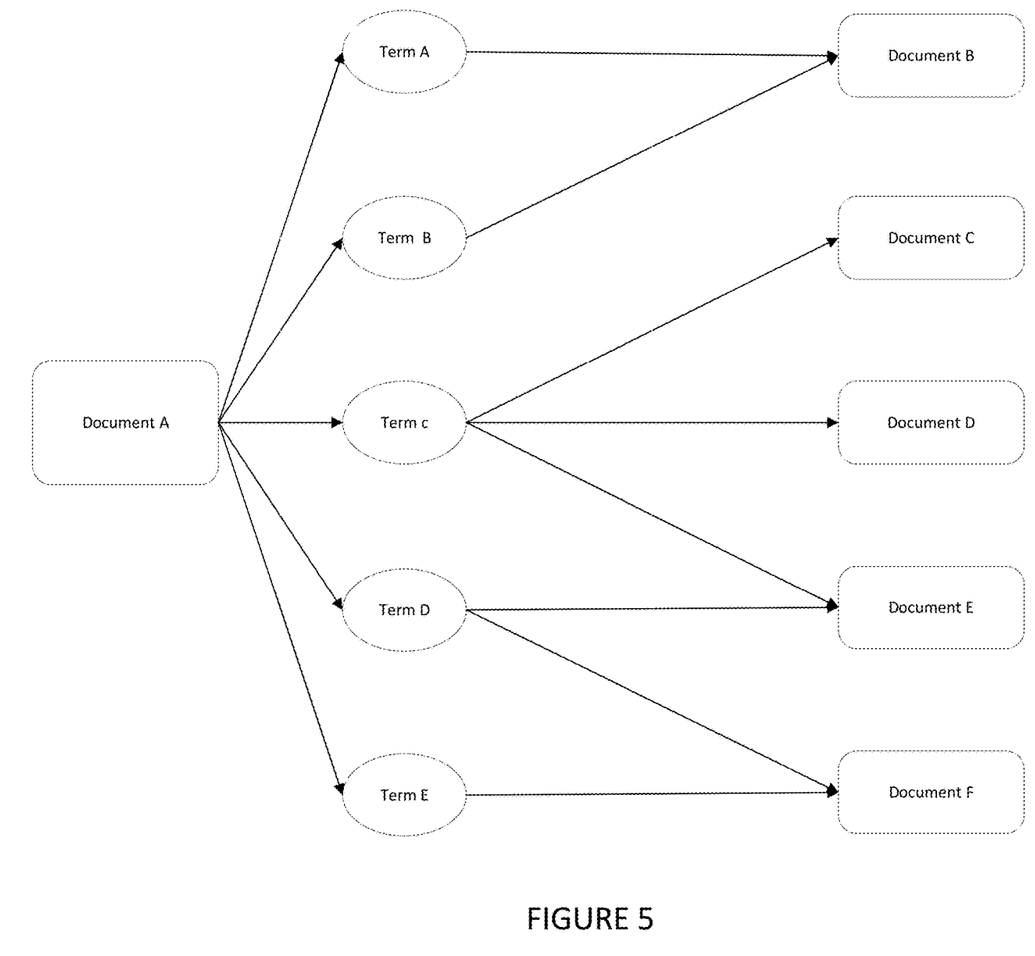
FIG. 5 illustrates an exemplary term/document relationship according to one embodiment.

Referring to FIG. 5, source Document A is shown on the left. Documents B, C, D, E, and F are documents that the application identifies as being similar to document A. In the middle are common terms (e.g., Terms A, B, C, D, E) that link the source and matching documents. A given term may appear in multiple matching documents FIG. 6 depicts an exemplary screenshot depicting the source document on the left linking to matching documents and linked through common terms. In addition, FIG. 6 illustrates a follow-on search from one of the matching documents. By executing multiple searches, the universe of documents may be navigated based on strands of common meaning.

Figure 6:
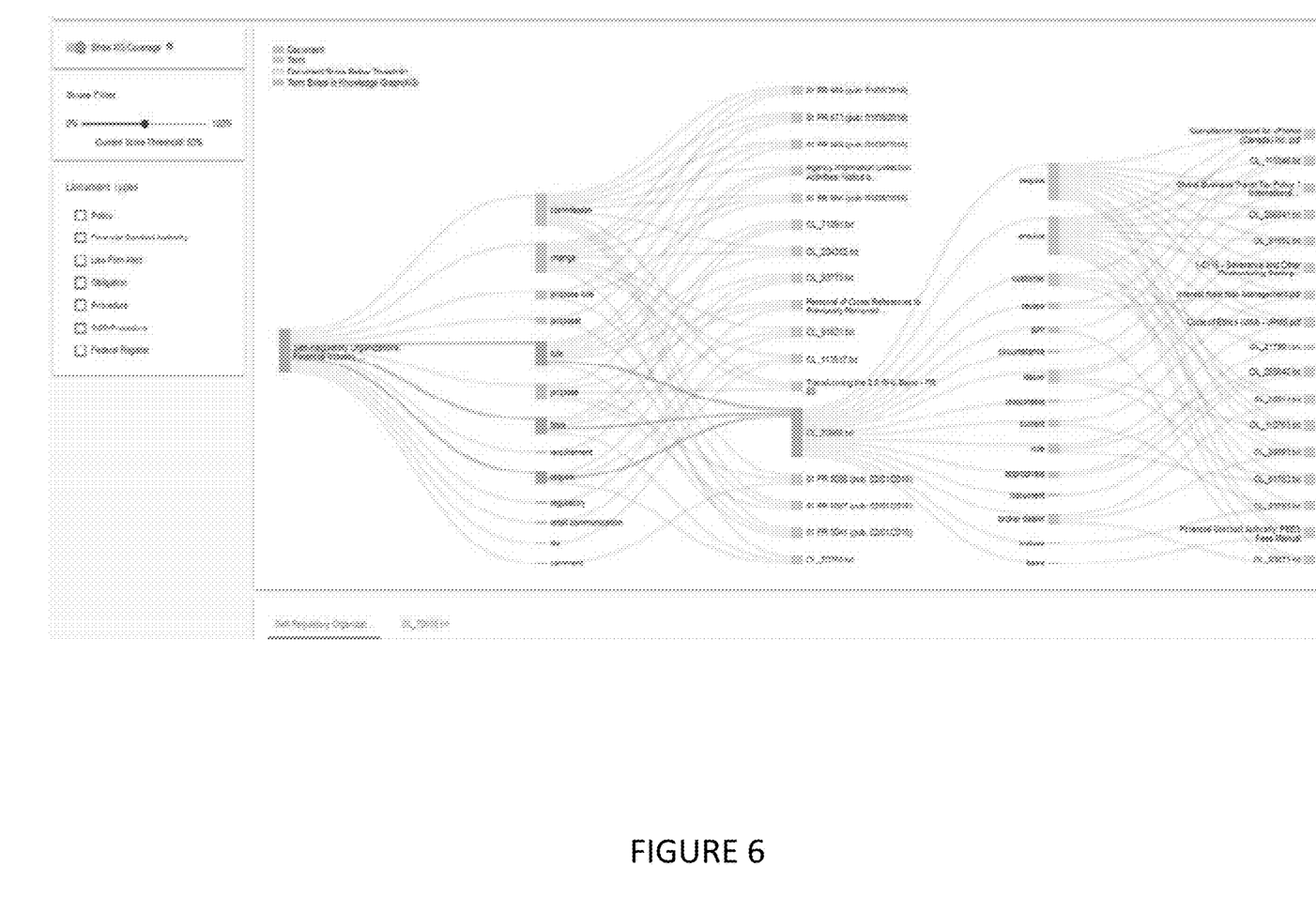
FIG. 6 illustrates an exemplary output according to one embodiment.
Figure 7:
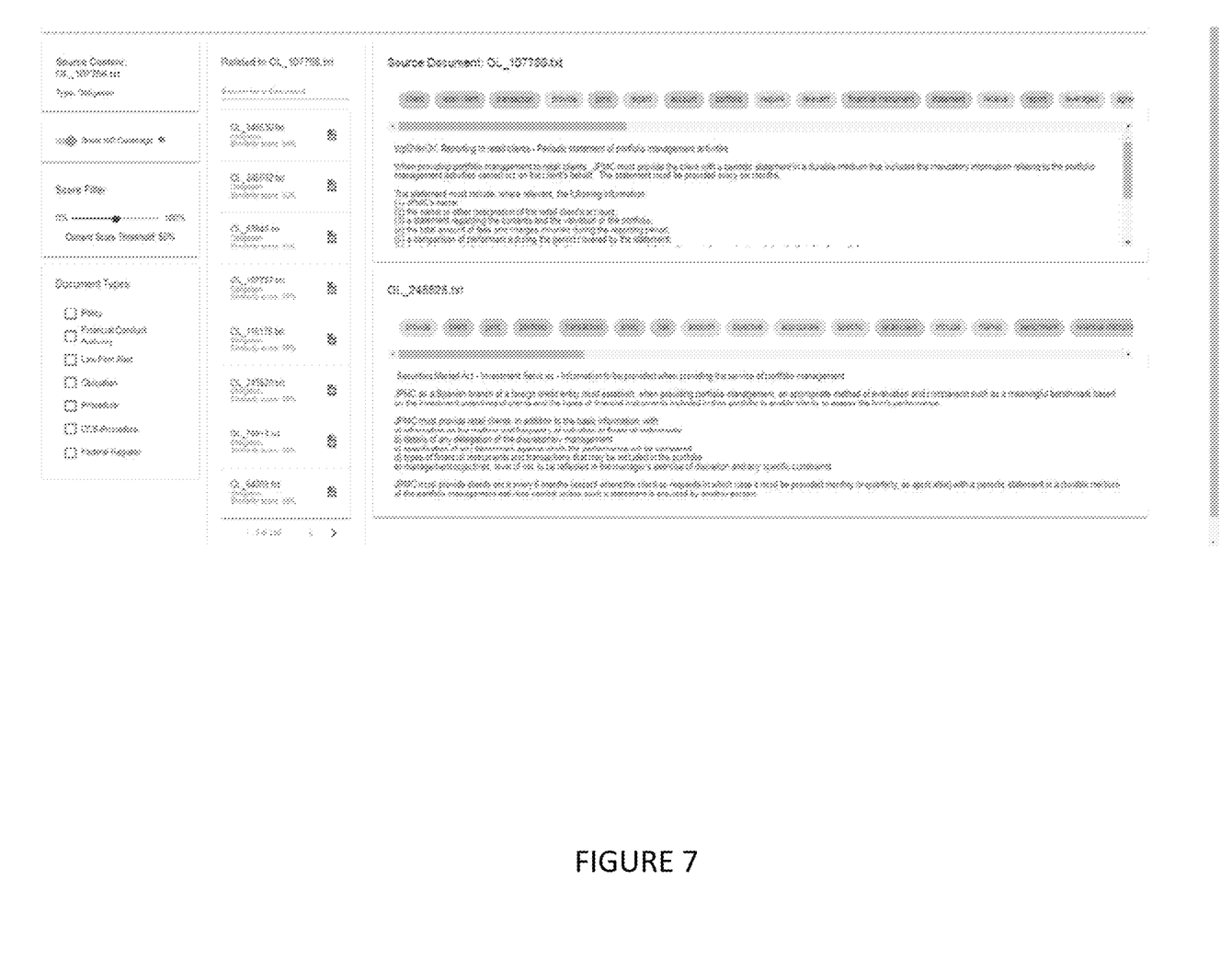
FIG. 7 illustrates an exemplary output according to another embodiment.

FIG. 7 provides a different representation of the data in FIG. 6. In FIG. 7, the source document are listed on the left and the target documents in the column next to it. This view adds a keyword profile for each document (i.e., the term chips at the top of the document text) and may be better suited for presenting a large numbers of results.

Although several embodiments are disclosed, it should be recognized that these embodiments are not exclusive to each other, and elements of one embodiment may be used with others.

Hereinafter, general aspects of implementation of the systems and methods of the invention will be described.

The system of the invention or portions of the system of the invention may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for document vectorization, comprising:
in an information processing apparatus comprising at least one computer processor:
providing a knowledge graph from a graph database, wherein the graph database includes nodes, edges and properties that maintain the knowledge graph, and wherein the knowledge graph represents a derived network of relationships between previously evaluated documents;
providing a vector library including vector representations of words and terms;
receiving, from a document repository, a source document;
extracting text from the source document;
cleaning the extracted text by removing unnecessary characters from the extracted text;
separating the text into a plurality of parts;
identifying proper noun occurrences in the plurality of parts based on the knowledge graph and the vector library and mapping the proper noun occurrences to corresponding proper noun vectors in the vector library;

converting a plurality of words in the extracted text to lemma form;
identifying compound term occurrences in the plurality of parts based on the knowledge graph and the vector library and mapping the compound term occurrences to corresponding compound term vectors in the vector library;
determining occurrences of other remaining words in the plurality of parts;
mapping each of the occurrences of other remaining words to a corresponding word vector in the vector library;
averaging each mapped corresponding proper noun vector, each mapped corresponding compound term vector, and each mapped corresponding word vector to generate a single document vector for the document; and
storing the single document vector in a document vector repository.

2. The method of claim 1, further comprising:
retrieving a plurality of document vectors, including the single document vector, from the document vector repository;
calculating a cosine similarity score between each of the plurality of document vectors; and
storing the cosine similarity scores in a document graph.

3. The method of claim 2, further comprising:
calculating a locality sensitive hash for each of the plurality of document vectors.

4. The method of claim 1, comprising:
receiving a query comprising the source document;
determining that the single document vector is generated;
hashing the single document vector and a plurality of other document vectors with a locality sensitive hash, wherein the locality sensitive hash groups pluralities of document vectors into various locality sensitive hashing buckets;
identifying, based on the hashing, a locality sensitive hashing bucket that includes the single document vector and a plurality of other document vectors;
calculating a cosine similarity score between the single document vector and each of the plurality of other document vectors included in the locality sensitive hashing bucket;
selecting a one of the plurality of other document vectors having a closest cosine similarity score with the single document vector; and
identifying a document associated with the one of the plurality of other document vectors having the closest cosine similarity score with the single document vector.

5. The method of claim 4, further comprising:
identifying a plurality of words common to the source document and the document associated with the one of the plurality of other document vectors having the closest cosine similarity score with the single document vector; and
presenting the document associated with the one of the plurality of other document vectors having the closest cosine similarity score with the single document vector and the plurality of words common to the source document and the identified document.

6. The method of claim 5, further comprising querying a graph database for documents having a similar cosine similarity.

7. The method of claim 6, wherein the graph database comprises a knowledge graph.

8. The method of claim 1, wherein the source document comprises a binary file.

9. The method of claim 1, wherein the unnecessary characters include at least one of a mark, a symbol, a control character, an email address, and a URL.

10. The method of claim 1, wherein identifying proper noun occurrences comprises:
identifying a multi-word proper noun; and
rewriting the multi-word proper noun as a single term by inserting an underscore between the words in the multi-word proper noun.

11. The method of claim 1, wherein the lemma form comprises a dictionary or canonical form.

12. The method of claim 1, wherein identifying compound term occurrences comprises:
identifying a compound term; and
rewriting the compound term as single term by inserting an underscore between the terms in the compound term.

13. The method of claim 1, comprising:
removing stop words from the extracted text.

14. The method of claim 13, wherein removing stop words comprises identifying a word in the extracted text as a stop word using a list of stop words.

15. The method of claim 1, wherein mapping each of the occurrences of the other remaining words to a corresponding word vector comprises:
applying a skip grain algorithm to the other remaining words.

16. A system for document vectorization, comprising at least one server including a processor, wherein the at least one server is configured to:
provide a knowledge graph from a graph database, wherein the graph database includes nodes, edges and properties that maintain the knowledge graph, and wherein the knowledge graph represents a derived network of relationships between previously evaluated documents;
provide a vector library including vector representations of words and terms;
receive, from a document repository, a source document;
extract text from the source document;
clean the extracted text by removing unnecessary characters from the extracted text;
separate the text into a plurality of parts;
identify proper noun occurrences in the plurality of parts based on the knowledge graph and the vector library and mapping the proper noun occurrences to corresponding proper noun vectors in the vector library;
convert a plurality of words in the extracted text to lemma form;
identify compound term occurrences in the plurality of parts based on the knowledge graph and the vector library and mapping the compound term occurrences to corresponding compound term vectors in the vector library;
determine occurrences of other remaining words in the plurality of parts;
mapping each of the occurrences of other remaining words to a corresponding word vector in the vector library;
average each mapped corresponding proper noun vector, each mapped corresponding compound term vector, and each mapped corresponding word vector to generate a single document vector for the document; and store the single document vector in a document vector repository.

\* \* \* \* \*